(12) United States Patent
Henderson et al.

(10) Patent No.: US 7,004,690 B2
(45) Date of Patent: Feb. 28, 2006

(54) DRILL BUILD-UP REMOVER

(75) Inventors: Raymond N. Henderson, Federal Way, WA (US); Paul E. Faville, Renton, WA (US)

(73) Assignee: The Boeing Company, Chicago, IL (US)

( * ) Notice: Subject to any disclaimer, the term of this patent is extended or adjusted under 35 U.S.C. 154(b) by 549 days.

(21) Appl. No.: 10/285,265

(22) Filed: Oct. 30, 2002

(65) Prior Publication Data

US 2004/0086346 A1 May 6, 2004

(51) Int. Cl.
B23B 35/00 (2006.01)

(52) U.S. Cl. .......................... 408/1 R; 408/67; 408/18

(58) Field of Classification Search .............. 408/1 R, 408/8, 72 B, 115 B, 67, 18
See application file for complete search history.

(56) References Cited

U.S. PATENT DOCUMENTS

| | | | | |
|---|---|---|---|---|
| 2,008,436 A | * | 7/1935 | Cross ........................ 408/110 |
| 2,847,880 A | * | 8/1958 | Neidig ........................ 408/59 |
| 3,204,492 A | * | 9/1965 | Spreen ........................ 408/1 R |
| 3,667,080 A | * | 6/1972 | Persson ................... 15/236.06 |
| 3,689,168 A | * | 9/1972 | Persson ........................ 408/61 |
| 4,380,295 A | | 4/1983 | Soderberg et al. |
| 4,782,633 A | * | 11/1988 | Fuller, Jr. ........................ 451/9 |
| 5,333,973 A | * | 8/1994 | Hoshino et al. .............. 408/56 |
| 5,415,502 A | * | 5/1995 | Dahlin ..................... 408/72 B |
| 5,421,680 A | * | 6/1995 | Wu ............................ 408/1 R |
| 6,851,898 B1 | * | 2/2005 | Ege et al. ..................... 408/67 |

FOREIGN PATENT DOCUMENTS

| | | | |
|---|---|---|---|
| DE | 2255354 | * | 5/1974 |
| JP | 63-144906 | * | 6/1988 |
| JP | 6-114617 | * | 4/1994 |
| JP | 8-90322 | * | 4/1996 |
| JP | 9-131640 | * | 5/1997 |
| JP | 10-6172 | * | 1/1998 |

* cited by examiner

*Primary Examiner*—Daniel W. Howell
(74) *Attorney, Agent, or Firm*—Black Lowe & Graham PLLC

(57) ABSTRACT

A system is provided for removing build-up on drills. The system includes a sensing component that automatically senses the size of a drill, a first component that automatically grips the sensed drill and positioning the gripped drill to a first position, and a disc that includes a plurality of bushings of different sizes. The system also includes a second component that automatically rotates the disc according to the sensed size of the drill, and a third component that automatically forces the disc over a stationary drill.

18 Claims, 5 Drawing Sheets

DRILL BUILD-UP REMOVER

FIELD OF THE INVENTION

This invention relates generally to drills and, more specifically, to drill build-up removing.

BACKGROUND OF THE INVENTION

Various sizes and types of drills are widely used in many industrial environments, such as in aircraft manufacturing, to create holes of various sizes. Such usage frequently results in drills of various sizes being collected in a common receptacle for resharpening, build-up removing, or refurbishing after the drills have become dull, coated with build-up, and the like during use.

In the past, regardless of whether the drills are conventional or quick change, "spent" drills are sorted and the buildup is removed prior to re-sharpened. Removing of build-up and sorting the large number of drills is a time consuming and, thus, costly endeavor. As a result, attempts have been made to automate at least the sorting portion of this procedure. In this regard, one currently known machine automatically separates drills of one diameter from a mixture of drills of various diameters using various means, such as a linear variable differential transformer (LVDT) or laser analysis. However, there does not exist an effective and efficiently automatic build-up removing of large amounts of various-sized drills.

Therefore, there exists a need to quickly and effectively remove build-up on drills of various sizes.

SUMMARY OF THE INVENTION

The present invention provides a system for removing build-up on drills. The system automatically removes stainless steel build-up, inline with the sorting of the drills.

An embodiment of the system includes a sensing component that automatically senses the size of a drill, a first component that automatically grips the sensed drill and positions the gripped drill to a first position, and a disc that includes a plurality of bushings of different sizes. The bushings are suitably close to tolerance—approximately 0.0002" difference between the diameter of the drill and the bushing. The system also includes a second component that automatically rotates the disc according to the sensed size of the drill, and a third component that automatically forces the gripped drill through one of the bushings of the disc.

According to an aspect of the invention, the system further includes a controller that automatically controls the first, second, and third component based on the sensed size of the drill.

One or more of the bushings in the disc are floating bushings.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
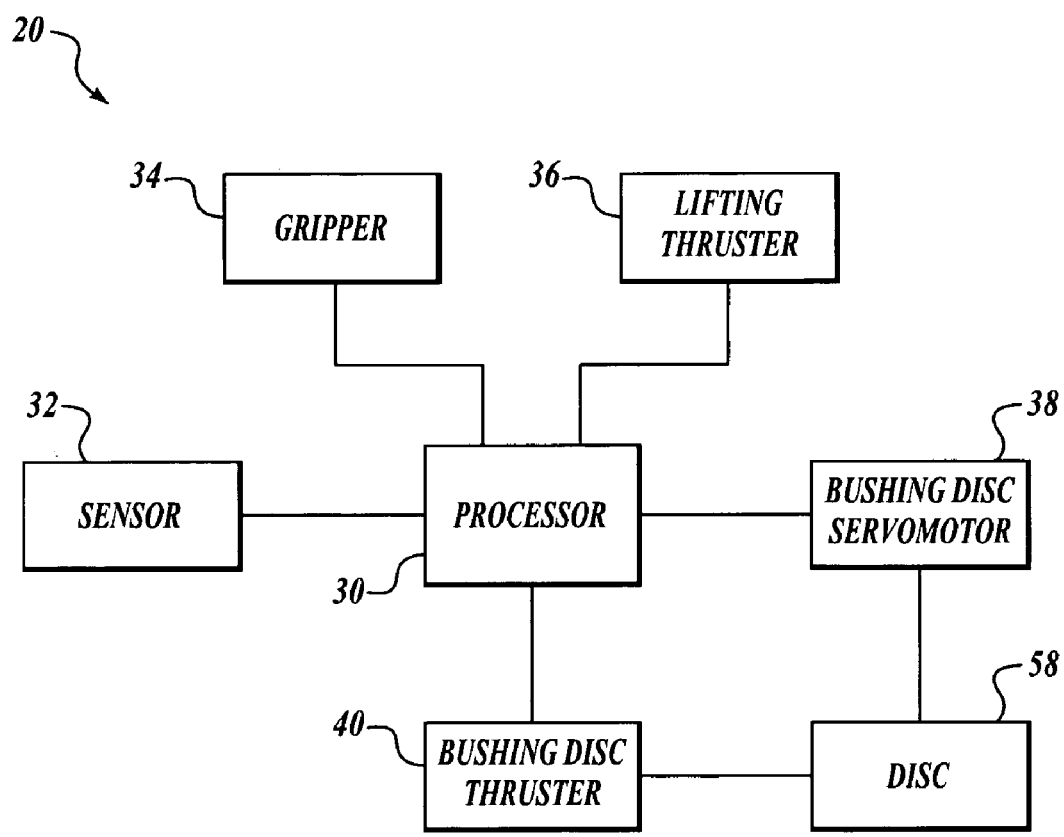
FIG. 1 is a block diagram of a build-up removing system formed in accordance with the present invention.

FIG. 1 illustrates an automated drill build-up removing system 20 that automatically performs build-up removal on various size drills. An embodiment of the system 20 includes a processor 30 coupled to a drill diameter sensor 32, a drill gripper 34, a drill lifting thruster motor 36, a bushing disc servomotor 38, and a bushing disc thruster 40. The bushing disc servomotor 38 and the bushing disc thruster 40 are connected to a bushing disc 58.

The drill diameter sensor 32 is suitably a laser beam scanner that scans each drill in a radial direction, thereby producing a signal indicative of the diameter of the drill. At a time as determined by the processor 30, the gripper 34 is instructed to grab the most recently scanned drill. The lifting thruster motor 36 is instructed by the processor 30 to lift the gripped drill to a certain position relative to the disc 58. The processor 30 instructs the bushing disc servomotor 38 to rotate the disc 58 to align a bushing for receiving gripped drill based on the sensed diameter signal. Once the disc 58 is properly aligned, the bushing disc thruster 40 is instructed by the processor 30 to push the gripped drill through the bushing on the disc 58.

Figure 2:
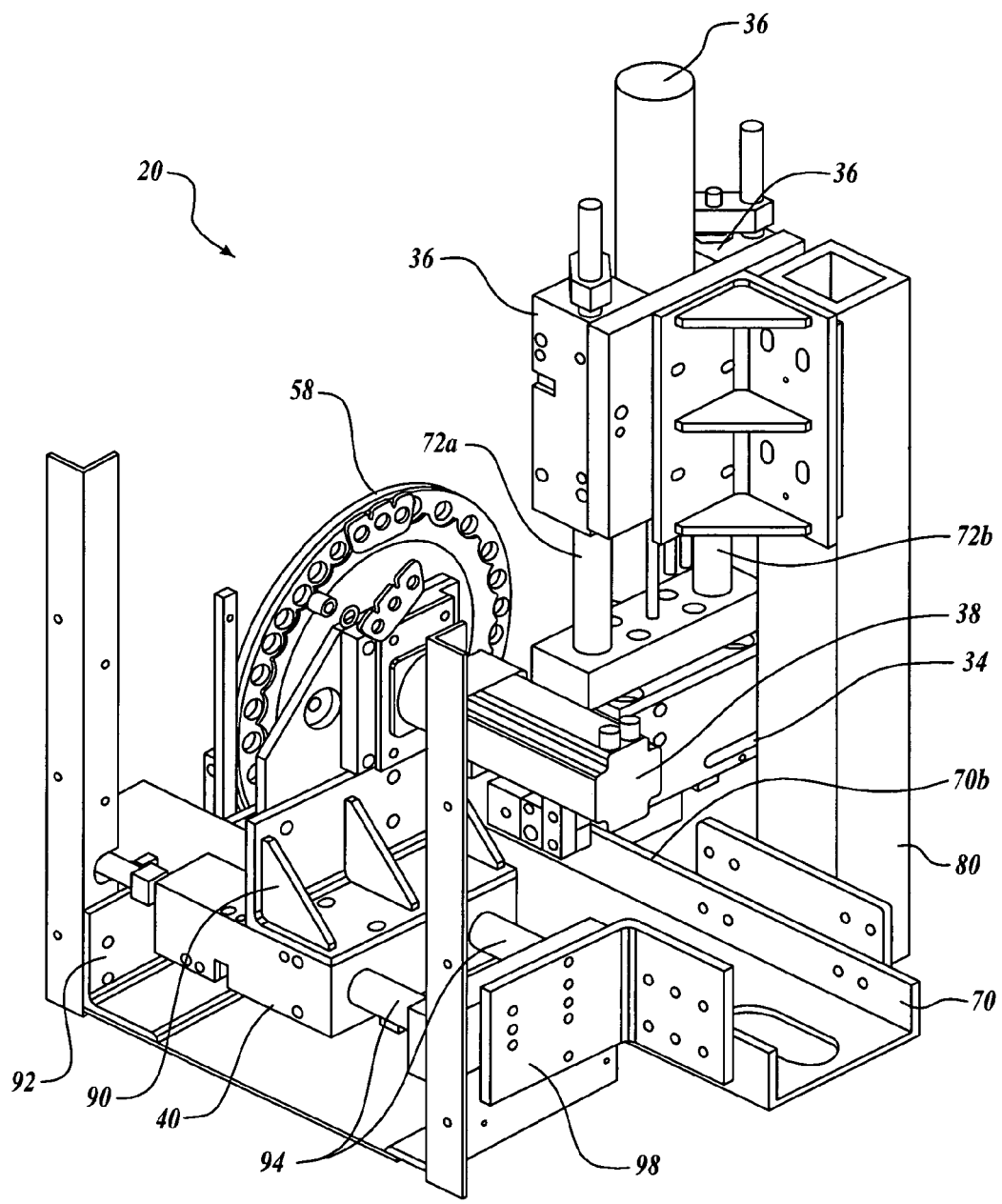
FIGS. 2, 3, 4A and 4B are perspective views of portions of the build-up removing system.

FIG. 2 illustrates a perspective view of a non-limiting example of the system 20 shown in FIG. 1. The system 20 includes a track 70 (FIG. 3) that suitably receives drills one-at-a-time. The track 70 is supported by a track support that is suitably at a predefined angle to allow drills to slide down the track 70 from a loading location. The lifting thruster motor 36 slidably receives lifting shafts 72a and 72b using linear bearings. The lifting shafts 72a and 72b are suitably attached to the gripper 34. The lifting thruster motor 36 is mounted to a mounting bracket 80 that is suitably attached to the track support. Before a drill to be processed is grabbed by the gripper 34, the lifting thruster motor 36 moves the gripper 34 into a position blocking movement of the drill on the track 70. Action of the gripper 34 and the lifting thruster motor 36 are described in more detail below in FIGS. 3, 4A, and 4B.

The track 70 receives a drill at a first end 70a (shown in FIG. 3) of the track 70. The sensor 32 (not shown in FIG. 2) is positioned at some location near the receiving end (not shown) of the track 70. The mounting bracket 80 is attached to the track support to allow the gripper 34 to be positioned at an approximate midpoint 70b of the track 70.

The bushing disc servomotor 38 includes a rotatable shaft (not shown) that is mounted to a center point of the circular bushing disc 58 for rotating the disc 58 to a desired position. A bracket 90 attaches the bushing disc servomotor 38 to the bushing disc thruster 40. The bushing disc thruster 40 is securely mounted at a first end 40a to a support structure 92. A second end of thruster 40, opposite the first end 40a, slidably receives one or more shafts 94. The one or more shafts 94 are securely attached to a mounting bracket 98 that is suitably attached to the track 70. The mounting bracket 92 is suitably attached to the track support.

Figure 3:
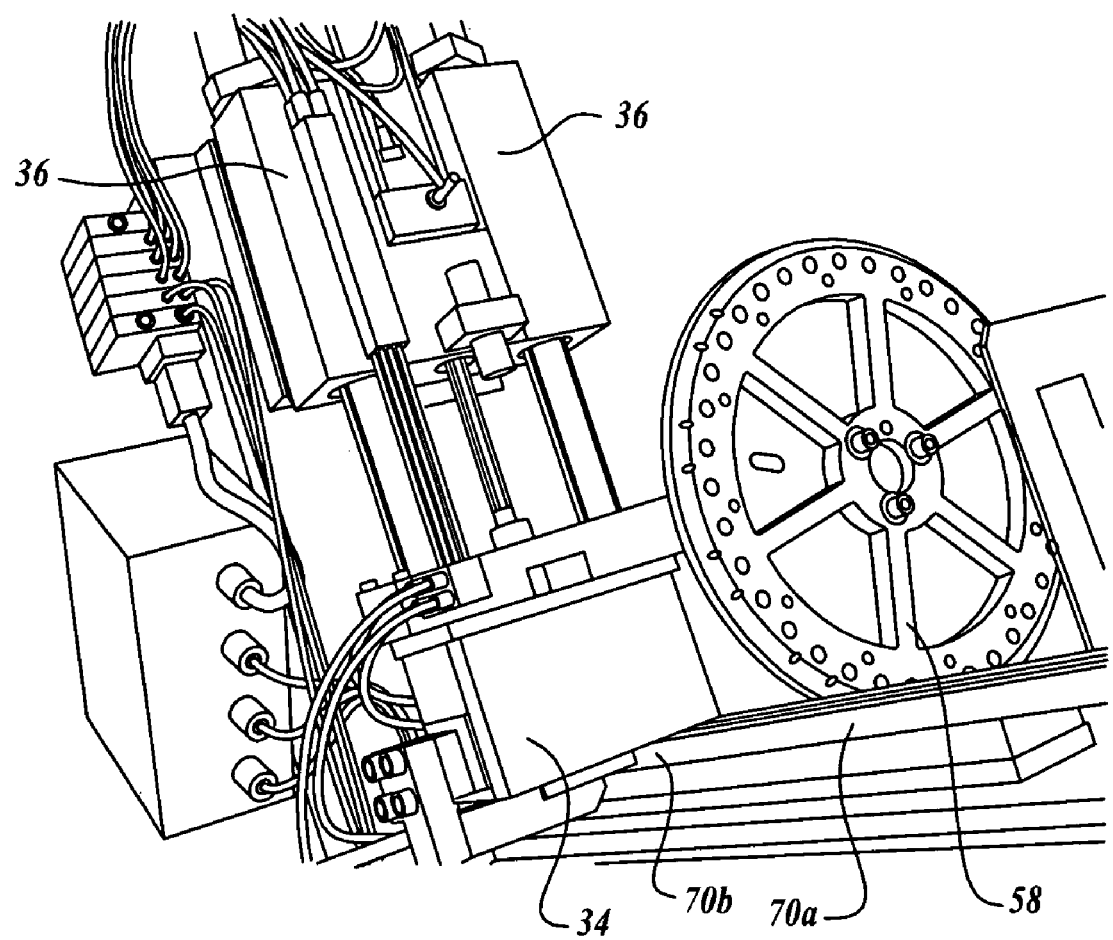
Figure 4A:
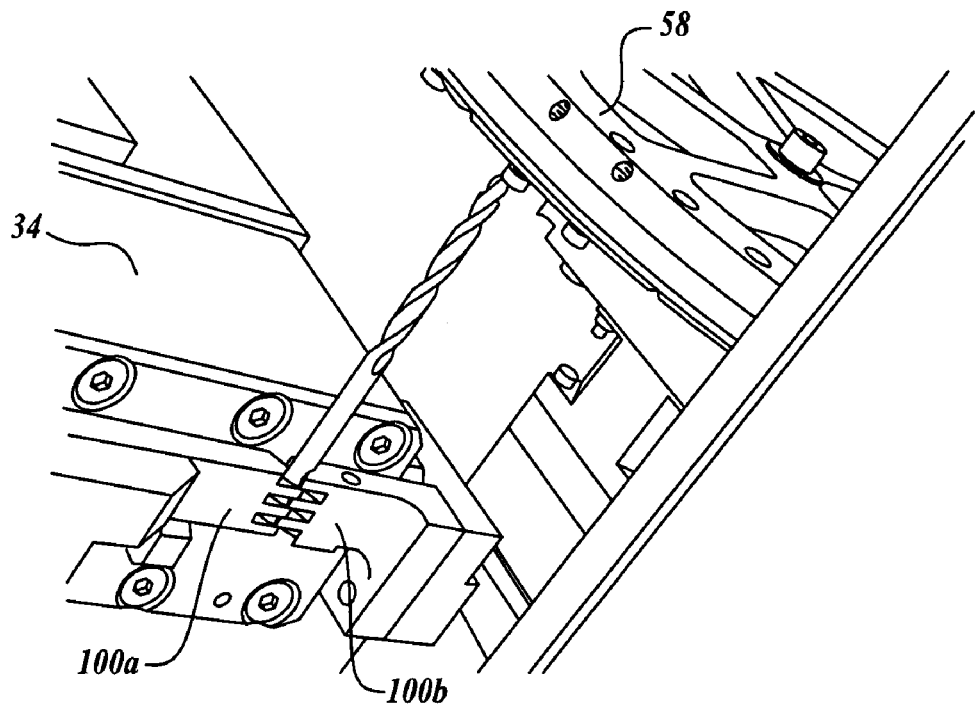
Figure 4B:
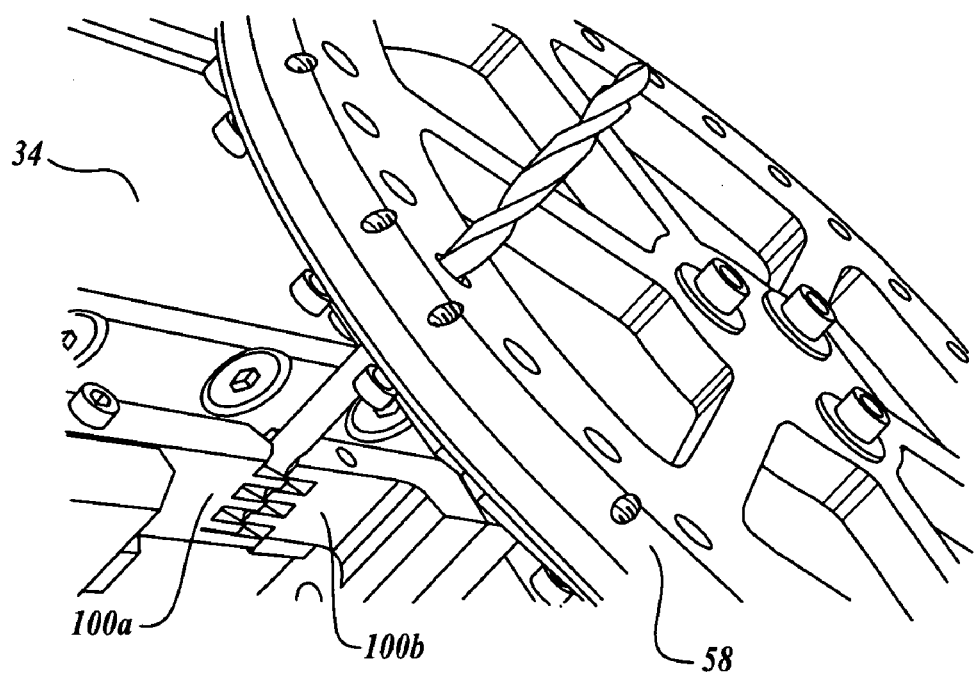

FIGS. 3, 4A, and 4B illustrate the action of gripping a drill and positioning it for insertion through a bushing of the bushing disc 58. As shown in FIG. 3, the lifting thruster motor 36 moves the gripper 34 to a first position relative to the track 70. In the first position, the gripper 34 stops an incoming drill and then grips the stopped drill (not shown).

FIGS. 4A and 4B illustrate two slidable gripping portions 100a and 100b of the gripper 34. The slidable gripping portions 100a and 100b include interlocking teeth 106 that securely holds a drill 104 in a proper position when the components 100a and 100b are closed on a chuck end of the stopped drill. The interlocking teeth 106 allow for secure gripping of various-sized drills. The lifting thruster motor 36 lifts the gripped drill to a predefined position relative to the disc 58. The bushing disc 58 includes various sized bushings mounted in the disc 58 at a predefined radial distance from the center of the bushing disc 58. The lifting thruster motor 36 raises the gripper 34 to position the drill at the same radial distance from the center of the bushing disc 58 as the bushing that is to receive the drill. The lifting thruster motor 36 suitably lifts the drill to a 9 o'clock position of the disc 58. While the drill is being lifted, the servomotor 38 suitably rotates the bushing disc 58 in order to line up the bushing that corresponds to the drill to the same radial position (9 o'clock) on the disc 58 as the gripped drill. Once the bushing disc 58 is properly rotated, as is shown in FIG. 4B, the bushing disc thruster 40 pushes the bushing disc 58 towards the gripped drill. As the drill passes through the bushing on the disc 58, burrs or inconsistency of the drill are scraped or removed by the bushing.

Figure 5:
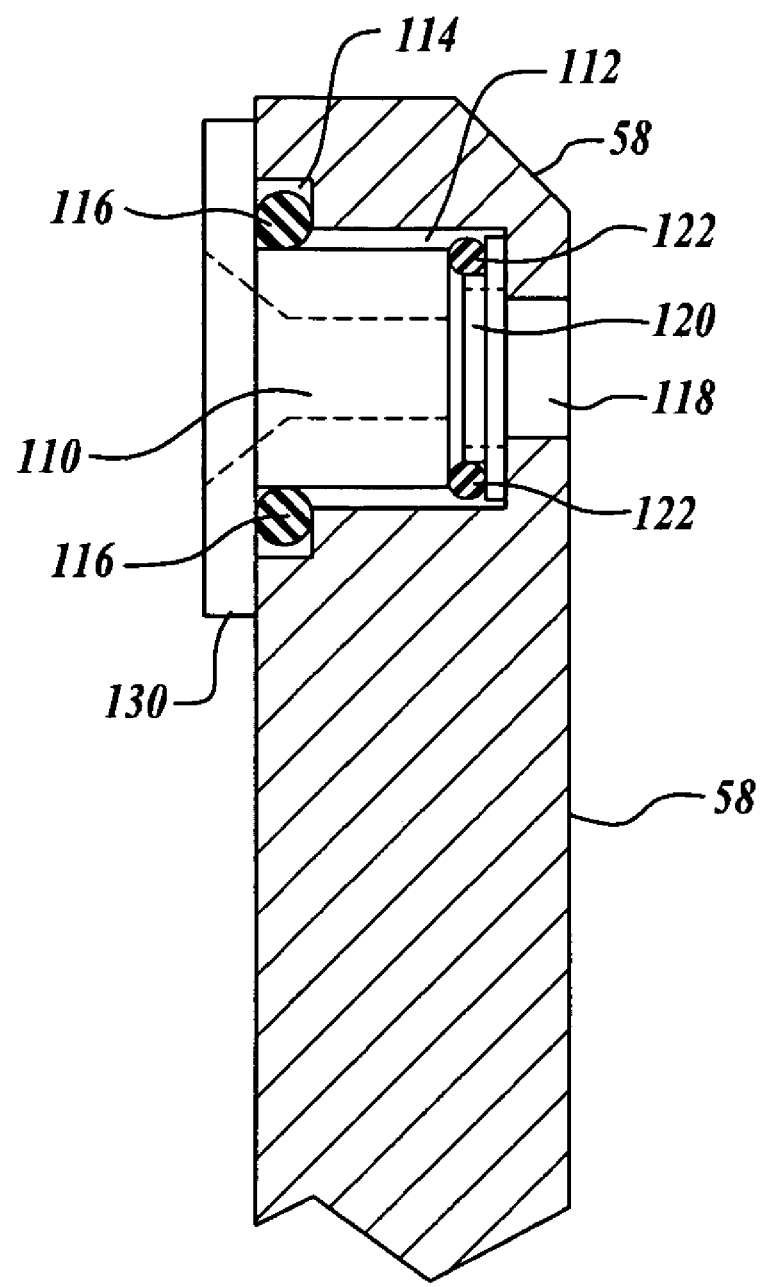
FIG. 5 is a cutaway view of a multi-bushing disc of the present invention.

FIG. 5 illustrates a non-limiting example of a bushing 110 mounted within the bushing disc 58. Each bushing 110 is mounted within a cavity 112. The cavity 112 is sized to allow longitudinal, lateral, and angular motion of the bushing 110, thereby creating a floating bushing. The cavity 112 includes a first opening 114 at a first side of the disc 58 that receives a gripped drill and a second opening 118 on a side opposite the first side of the disc 58. The diameter of the cavity 112 at the receiving side is sized to receive an O-ring 116 that has a larger diameter than the bushing 110. Adjacent to the first opening 114, the diameter of the cavity 112 is reduced to suitably something slightly larger than the bushing 110. The diameter of the second opening 118 is less than the diameter of the bushing 110 but greater than the diameter of the opening within the bushing 110. Mounted within the cavity 112 around the second opening 118 adjacent to the bushing 110 is an O-ring support structure 120. The O-ring support structure 120 supports a second O-ring 122. The bushing 110 floats within the cavity 112 and is supported in position within the cavity 112 by the O-ring 116 and the O-ring 122.

A mounting plate 130 mounts to the disc 58 over the first opening 114 in order to keep the bushing 110 within the cavity 112. The mounting plate 130 includes an opening wider than the bushings cavity. The opening of the mounting plate 130 is beveled in order to direct drills that are misaligned into more proper alignment with the bushing 110. Also, the receiving end of each bushing is slightly beveled in order to further direct the end of a drill through the opening of the bushing 110.

The gripper 34, lifting thruster motor 36, and the bushing disc thruster 40 are suitably pneumatically powered. The bushing disc servomotor 38 is suitably an electric motor. Alternate drive motors can be used.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for removing build-up on drills, the system comprising:
   a sensing component for automatically sensing the size of a drill;
   a first component for automatically gripping the sensed drill and positioning the gripped drill to a first position;
   a disc including a plurality of bushings of different sizes;
   a second component for automatically rotating the disc according to the sensed size of the drill; and
   a third component for automatically forcing the gripped drill through one of the bushings of the disc for removing build-up on the drill.

2. The system of claim 1, further comprising:
   a controller for automatically controlling the first, second, and third components based on the sensed size of the drill.

3. The system of claim 1, wherein the first and third components are pneumatically powered.

4. The system of claim 1, wherein the second component includes a servomotor.

5. The system of claim 1, wherein one or more of the bushings in the disc are floating bushings.

6. The system of claim 1, further comprising a track for directing drills to the sensing component.

7. The system of claim 6, wherein the first and third components are mounted to the track.

8. The system of claim 7, wherein the second component and the disc are coupled to the third component.

9. A method for removing build-up on drills, the method comprising:
   automatically sensing size of a drill with an automated sensing component;
   automatically gripping the sensed drill with a first component;
   automatically positioning the gripped drill to a first position relative to a disc, wherein the disc includes a plurality of bushings of different sizes;
   automatically rotating the disc according to the sensed size of the drill; and
   automatically forcing the gripped drill through one of the bushings of the disc for removing build-up on the drill.

10. The method of claim 9, wherein gripping, positioning, and forcing are pneumatically performed.

11. The method of claim 9, wherein rotating is performed by a servomotor.

12. The method of claim 9, wherein one or more of the bushings in the disc are floating bushings.

13. A system for removing build-up on drills, the system comprising:
   a track for receiving drills one at a time;
   a sensing component for automatically sensing the size of a drill on the track;
   a first component for automatically gripping the sensed drill off of the track and positioning the gripped drill to a first position;
   a disc including a plurality of bushings of different sizes;
   a second component for automatically rotating the disc according to the sensed size of the drill;
   a third component for automatically forcing the gripped drill through one of the bushings of the disc for removing build-up on the drill; and
   a controller for automatically controlling the first, second, and third components based on the sensed size of the drill.

14. The system of claim 13, wherein the first and third components are pneumatically powered.

15. The system of claim 13, wherein the second component includes a servomotor.

16. The system of claim 13, wherein one or more of the bushings in the disc are floating bushings.

17. The system of claim 13, wherein the first and third components are mounted to the track.

18. The system of claim 17, wherein the second component and the disc are coupled to the third component.

* * * * *